United States Patent
Nicholson et al.

(10) Patent No.: US 10,283,117 B2
(45) Date of Patent: May 7, 2019

(54) SYSTEMS AND METHODS FOR IDENTIFICATION OF RESPONSE CUE AT PERIPHERAL DEVICE

(71) Applicant: Lenovo (Singapore) Pte. Ltd., New Tech Park (SG)

(72) Inventors: John Weldon Nicholson, Cary, NC (US); Daryl Cromer, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/626,721

(22) Filed: Jun. 19, 2017

(65) Prior Publication Data

US 2018/0366115 A1 Dec. 20, 2018

(51) Int. Cl.
| | |
|---|---|
| *G10L 15/08* | (2006.01) |
| *G10L 15/22* | (2006.01) |
| *G10L 15/30* | (2013.01) |
| *G06F 3/16* | (2006.01) |
| *G06F 1/3206* | (2019.01) |

(52) U.S. Cl.
CPC ............ *G10L 15/22* (2013.01); *G06F 1/3206* (2013.01); *G06F 3/167* (2013.01); *G10L 15/08* (2013.01); *G10L 15/30* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,704,009 | A * | 12/1997 | Cline | G06F 3/16 704/201 |
| 6,070,140 | A * | 5/2000 | Tran | G06F 1/3203 704/275 |
| 6,529,875 | B1 * | 3/2003 | Nakajima | A63F 13/02 704/275 |
| 7,684,766 | B2 * | 3/2010 | Lim | H04M 1/72513 455/79 |
| 8,340,975 | B1 * | 12/2012 | Rosenberger | G10L 15/22 704/270 |
| 9,318,107 | B1 * | 4/2016 | Sharifi | G10L 15/08 |
| 9,412,361 | B1 * | 8/2016 | Geramifard | G10L 25/51 |
| 9,619,200 | B2 * | 4/2017 | Chakladar | G06F 3/167 |
| 2004/0259542 | A1 * | 12/2004 | Viitamaki | H04L 12/12 455/426.2 |

(Continued)

*Primary Examiner* — Fariba Sirjani
(74) *Attorney, Agent, or Firm* — John M. Rogitz; John L. Rogitz

(57) ABSTRACT

In one aspect, a first device includes at least one processor, a microphone accessible to the at least one processor, a communication interface accessible to the at least one processor, and storage accessible to the at least one processor. The storage bears instructions executable by the at least one processor to await first voice input comprising a response cue and receive, from the microphone, the first voice input comprising the response cue. The instructions are also executable by the at least one processor to, responsive to receipt of the first voice input comprising the response cue, transmit a wake up command to a second device different from the first device. The wake up command is transmitted via the communication interface using a peripheral device communication protocol.

20 Claims, 6 Drawing Sheets

(56) References Cited

U.S. PATENT DOCUMENTS

| | | | |
|---|---|---|---|
| 2006/0206326 A1* | 9/2006 | Fukada | G10L 15/187 704/239 |
| 2007/0201639 A1* | 8/2007 | Park | G10L 15/30 379/90.01 |
| 2007/0281748 A1* | 12/2007 | Piekarski | H04M 1/22 455/565 |
| 2007/0281761 A1* | 12/2007 | Kim | H04M 1/6008 455/575.2 |
| 2008/0046250 A1* | 2/2008 | Agapi | G10L 15/075 704/275 |
| 2008/0082338 A1* | 4/2008 | O'Neil | A61B 5/145 704/275 |
| 2009/0149127 A1* | 6/2009 | Viitamaki | H04M 1/0245 455/41.2 |
| 2009/0204409 A1* | 8/2009 | Mozer | G10L 15/30 704/275 |
| 2009/0210233 A1* | 8/2009 | Thompson, III | G06F 17/30654 704/275 |
| 2010/0185448 A1* | 7/2010 | Meisel | G10L 15/22 704/256.1 |
| 2011/0088086 A1* | 4/2011 | Swink | G06F 3/04883 726/7 |
| 2012/0036556 A1* | 2/2012 | LeBeau | G06F 3/048 726/3 |
| 2012/0052907 A1* | 3/2012 | Gilbreath | H04M 1/6041 455/556.1 |
| 2013/0132095 A1* | 5/2013 | Murthi | G06F 1/3234 704/275 |
| 2013/0289994 A1* | 10/2013 | Newman | G10L 15/22 704/254 |
| 2013/0325484 A1* | 12/2013 | Chakladar | G06F 3/167 704/275 |
| 2014/0244273 A1* | 8/2014 | Laroche | G06F 1/3206 704/275 |
| 2016/0148615 A1* | 5/2016 | Lee | G10L 15/22 704/275 |
| 2018/0366115 A1* | 12/2018 | Nicholson | G10L 15/22 |

* cited by examiner

SYSTEMS AND METHODS FOR IDENTIFICATION OF RESPONSE CUE AT PERIPHERAL DEVICE

BACKGROUND

Personal computers (PCs) consume a relatively high amount of power when fully powered on. Therefore, to help conserve energy and battery power, PCs are sometimes put into a lower-power sleep state, but as a result do not have the same processing capabilities as when fully powered on. To power the PC back on from such a sleep state, the PC may be woken up.

However, as recognized herein, many users desire "always-on" functionality for their PCs just as they do for their smartphones and tablets, which typically do not enter the same type of deep sleep states as PCs. As also recognized herein, one reason for this is so that users can provide voice input to a digital assistant operated by the PC whenever they wish, without having to wait the relatively lengthy amount of time it takes for the PC to be awoken from its sleep state to then be able to process the input using the digital assistant. There are currently no adequate solutions to the foregoing computer-related, technological problem evident in these competing power saving and always-on interests.

SUMMARY

Accordingly, in one aspect a first device includes at least one processor, a microphone accessible to the at least one processor, a communication interface accessible to the at least one processor, and storage accessible to the at least one processor. The storage bears instructions executable by the at least one processor to await first voice input comprising a response cue and receive, from the microphone, the first voice input comprising the response cue. The instructions are also executable by the at least one processor to, responsive to receipt of the first voice input comprising the response cue, transmit a wake up command to a second device different from the first device. The wake up command is transmitted via the communication interface using a peripheral device communication protocol.

In another aspect, a method includes receiving and identifying a response cue at a peripheral device, with the response cue being identified using a digital signal processor (DSP). The method also includes transmitting, from the peripheral device and responsive to identifying the response cue at the peripheral device, a wake up signal to a second device different from the peripheral device. The wake up signal is transmitted to the second device using a communication protocol the peripheral device otherwise uses to communicate with the second device.

In still another aspect, a computer readable storage medium that is not a transitory signal includes instructions executable by at least one processor to receive a response cue at a peripheral device. The instructions are also executable by the at least one processor to transmit, from the peripheral device and responsive to receipt of the response cue at the peripheral device, a wake up command to a second device different from the peripheral device. The wake up command is transmitted to the second device using a communication protocol the peripheral device also uses to communicate with the second device for purposes other than transmission of the wake up command.

The details of present principles, both as to their structure and operation, can best be understood in reference to the accompanying drawings, in which like reference numerals refer to like parts, and in which:

DETAILED DESCRIPTION

Figure 1:
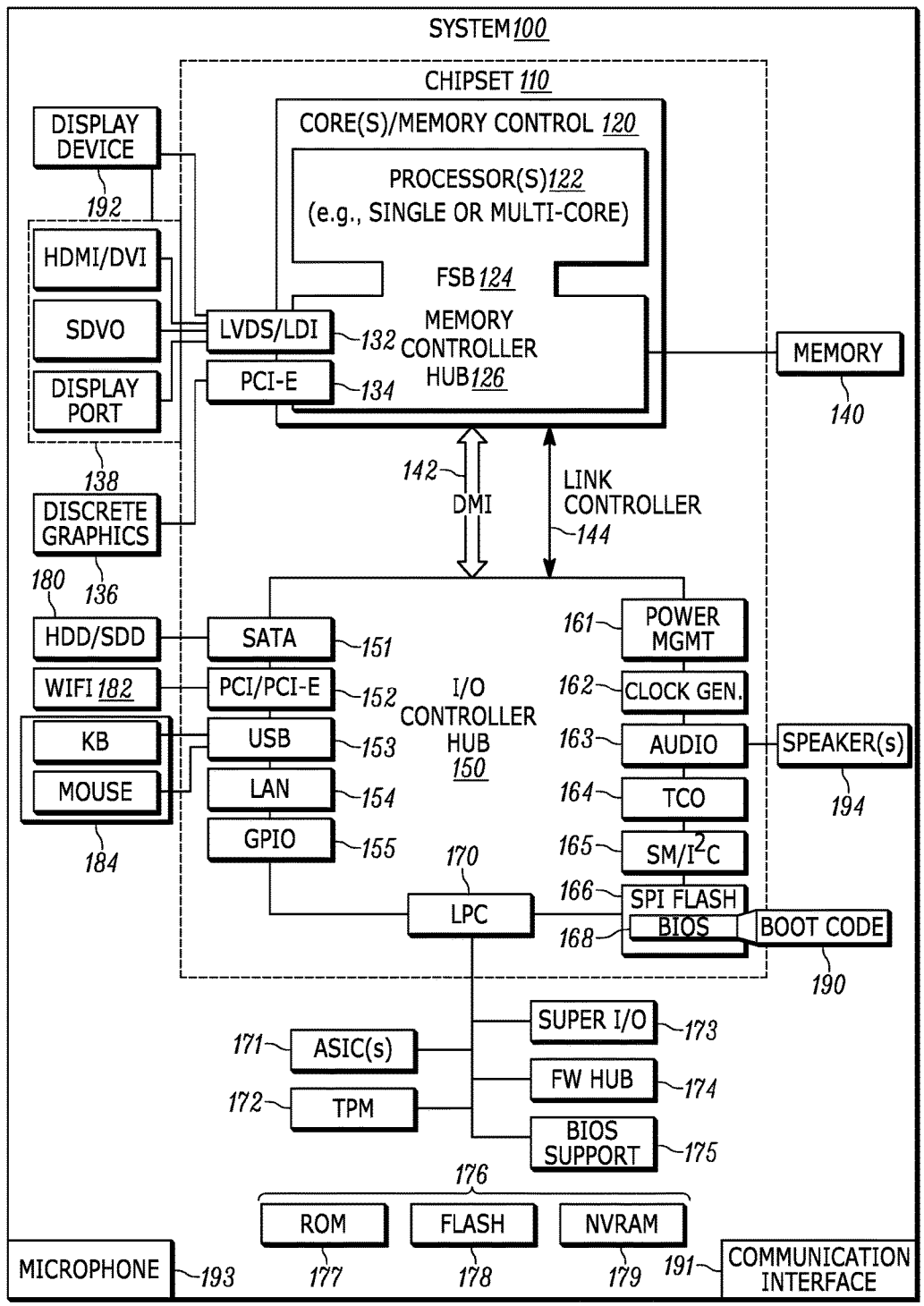
FIG. 1 is a block diagram of an example system in accordance with present principles.

As disclosed herein, wake mechanisms such as "wake on USB", Bluetooth waking, LAN waking, WLAN waking, etc. may be used for a peripheral device to wake up a PC once triggered by an "always-on" response cue or voice trigger for a digital assistant that is received at a peripheral device.

Additionally, a voice request received at the peripheral device subsequent to receipt of the voice trigger may be buffered and then transferred to the PC following PC wake-up (e.g., buffered at faster than real-time speeds at which the input was received). Following the transfer of the audio buffer, a voice feed to the PC from the peripheral device's microphone may be transitioned to a streaming microphone signal.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) such as a general-purpose processor/central processing unit (CPU) and/or a digital signal processor (DSP), and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more communication interfaces 191 for communication between a peripheral device and second device such as a personal computer as disclosed herein. The communication interface(s) 191 may be for one or more of Bluetooth or Bluetooth low energy communication, near-field communication protocol (NFC) and/or a radio frequency identification (RFID) communication, universal serial bus (USB)/bus line communication (e.g., wired or wireless), a local area network communication, wide area network (WAN) communication, Wi-Fi/Wi-Fi direct communication specifically, or even infrared (IR) communication.

Further, the system 100 may include an audio receiver/microphone 193 that provides input to the processor(s) 122 based on audio that is detected, such as via a user providing audible voice input to the microphone 193 in accordance with present principles.

Additionally, though not shown for clarity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system may include a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
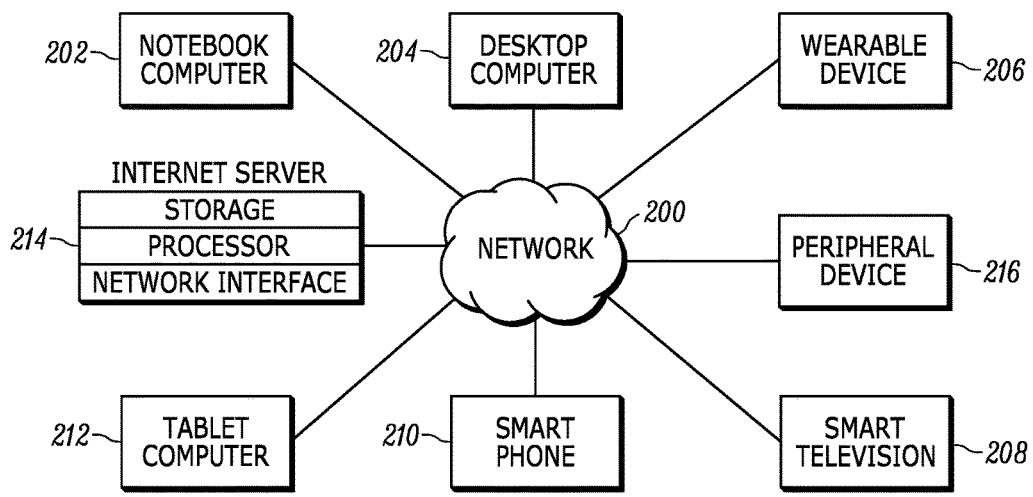
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a peripheral device 216, and a server 214 such as an Internet server that may provide cloud storage accessible to the devices 202-212, 216. It is to be understood that the devices 202-216 are configured to communicate with each other over the network 200 to undertake present principles.

Describing the peripheral device 216 in more detail, it may be a stand-alone keyboard such as a wireless keyboard, a stand-alone mouse such as a wireless mouse, a stand-alone speaker such as a wireless speaker, or a stand-alone camera such as a digital camera, webcam, or wireless camera. The peripheral device 216 may also be a stand-alone microphone such as a wireless microphone, but whether a stand-alone microphone or another type of peripheral device such as a wireless speaker or wireless keyboard it is to be nonetheless understood that the peripheral may include a microphone disposed thereon for receiving voice input in accordance with present principles.

The peripheral device 216 may also include storage including instructions for executing logic in accordance with present principles, as well as a communication interface for communicating with a personal computer (PC) such as the desktop computer 204 or notebook/laptop computer 202 to which the peripheral device 216 may not be tangibly coupled to or disposed on (even if wirelessly communicating with it). The communication interface may be, e.g., a wireless communication interface for communication using one or more of a Bluetooth or Bluetooth low energy communication protocol, a near-field communication protocol (NFC) and/or a radio frequency identification (RFID) protocol, a universal serial bus (USB) communication protocol, a local area network (LAN) communication protocol, a wide area network (WAN) communication protocol, or even an infrared (IR) communication protocol.

It is to be further understood that in addition to having its own microphone, storage, and communication interface, the peripheral device 216 may also include one or more processors, such as a digital signal processor (DSP), a field-programmable gate array (FPGA) or even another type of programmable logic device for receiving voice input of a response cue which may then be used to wake up a general-purpose processor/central processing unit on a second device as described herein.

Figure 3:
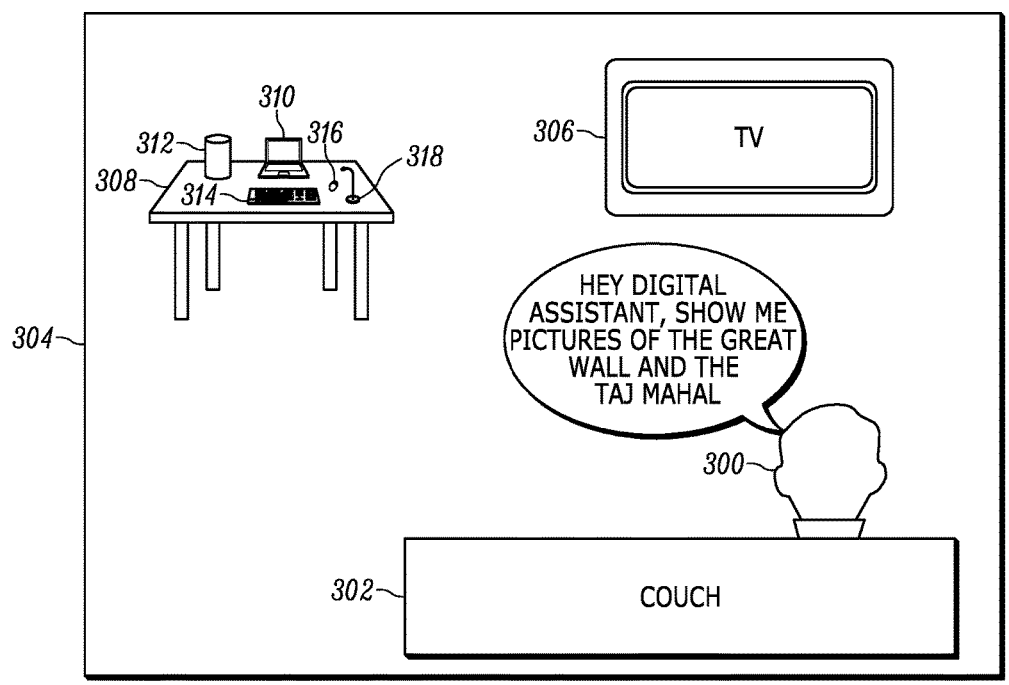
FIG. 3 is an example illustration in accordance with present principles.

Continuing now in reference to FIG. 3, an example illustration is shown of how a user might employ a peripheral device to get the assistance of a digital/personal assistant to perform a task. As shown in FIG. 3, a user 300 is sitting on a couch 302 in a room 304 while watching audio video content presented on a television 306. Also in the room 304 is a desk 308 having a personal computer 310 disposed thereon, such as a laptop computer. The computer 310 is understood to have a digital/personal assistant application stored in its storage that may be executed by the general-purpose processor/central processing unit (CPU) of the computer 310.

Also on the desk 308 are one or more peripheral devices, such as a stand-alone Bluetooth speaker 312, a wireless keyboard 314, a wireless mouse 316, and a stand-alone microphone 318. As may be appreciated from FIG. 3, each of the peripheral devices 312-318 may wirelessly communicate with the personal computer 310 but are not tangibly coupled to the housing of the personal computer 310 such as via a wired connection or by actually being attached to the housing itself.

It is to be understood that in the illustration 300 shown, the personal computer 310 is in a sleep state in which the computer 310 has not been completely shut down into an "off" state but instead has been placed into a lower-power state from a fully powered-on state. In the sleep state, the computer 310 may maintain its state and/or loaded data in its random-access memory (RAM) as might have been loaded into the RAM while in the fully powered-on state (such as having its digital assistant application loaded into the RAM). Alternatively, in the sleep state the state data from the RAM may have been moved from the RAM into hard disk drive storage (sometimes referred to as a "hibernation" state specifically). But in either case, the general purpose processor and/or CPU may be powered off while in the sleep state to conserve power, even though the state data may be maintained in RAM or other storage.

Additionally, also while in the sleep state, note that the computer 310 may still maintain wireless communication with the peripheral devices 312-318 using a wireless communication interface on the computer 310, with the wireless communication interface having its own processor (e.g., microprocessor) for maintaining such communication while the computer 310 is in the sleep state.

As shown in FIG. 3, the user 300 may provide first voice input of a response cue for a digital assistant of "Hey digital assistant", which may be followed by second voice input requesting that a task be executed by the digital assistant. In this case, the second voice input includes "show me pictures of the Great Wall and the Taj Mahal". Based on a digital assistant feature/application executing on at least one of the peripheral devices 312-318 using a DSP and/or FPGA on the respective peripheral device, and based on the voice input being received at the peripheral device via a microphone coupled to the housing of the peripheral device, the peripheral device may recognize the response cue using the DSP (which may be configured or pre-programmed to recognize the response cue) to then know to buffer ensuing voice input so that the computer 310 can eventually process the ensuing voice input and provide output as a response to the cue.

Thus, it is to be understood that the digital assistant feature/application executing at the peripheral device may operate in conjunction with the digital assistant application as stored at the computer 310 so that once the computer 310 has been awoken from its sleep state the second voice input may be passed to the computer 310. The digital assistant application stored at the computer 310 may then be executed to process the second voice input and execute a task in conformance therewith. Any additional voice input received at the peripheral device after the computer 310 has transitioned out of its sleep state may then be streamed from the peripheral device's microphone to the computer 310 so that the digital assistant executing at the computer 310 may process that input as well.

Note that without the response cue, any ensuing voice input might not otherwise be processed or buffered by the peripheral device since the user 300 might just be speaking generally or to another person rather than providing voice input to a device. But because the response cue has been provided, the peripheral device at which the response cue was recognized may transmit a wake up signal/command to the computer 310 to awaken, and the additional voice input of "show me pictures of the Great Wall and the Taj Mahal" may be buffered and then passed to the computer 310.

Accordingly, once the computer 310 awakens and transmits a signal back to the peripheral device that it has awoken, the peripheral device may pass this buffered voice input to the computer 310 so that the digital assistant that is now fully executing at the computer 310 may process the input to perform a task. In this case, the task is presenting pictures on a display of the Great Wall of China and the Taj Mahal.

Figure 4:
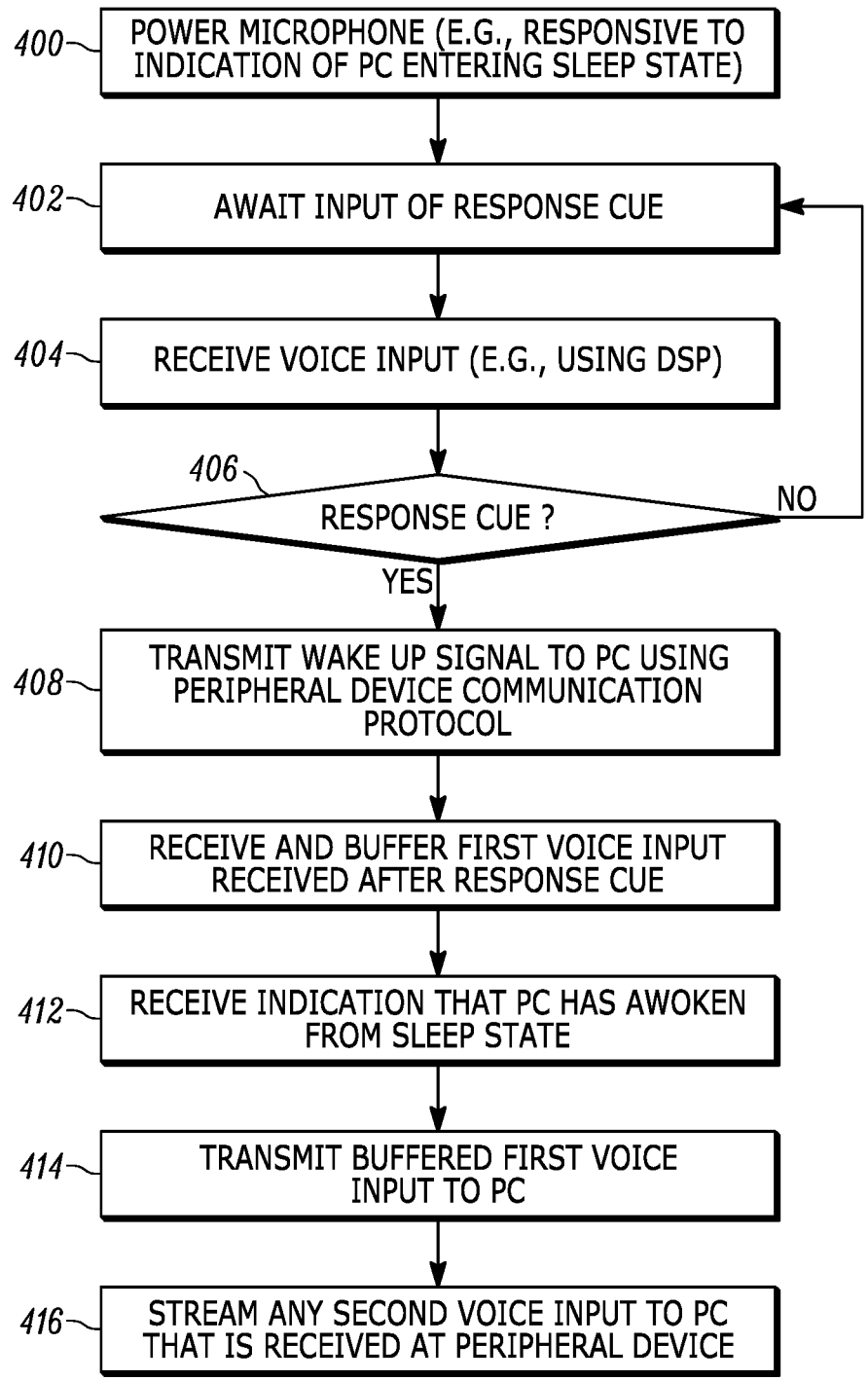
FIGS. 4 and 5 are flow charts of example algorithms in accordance with present principles.
Figure 5:
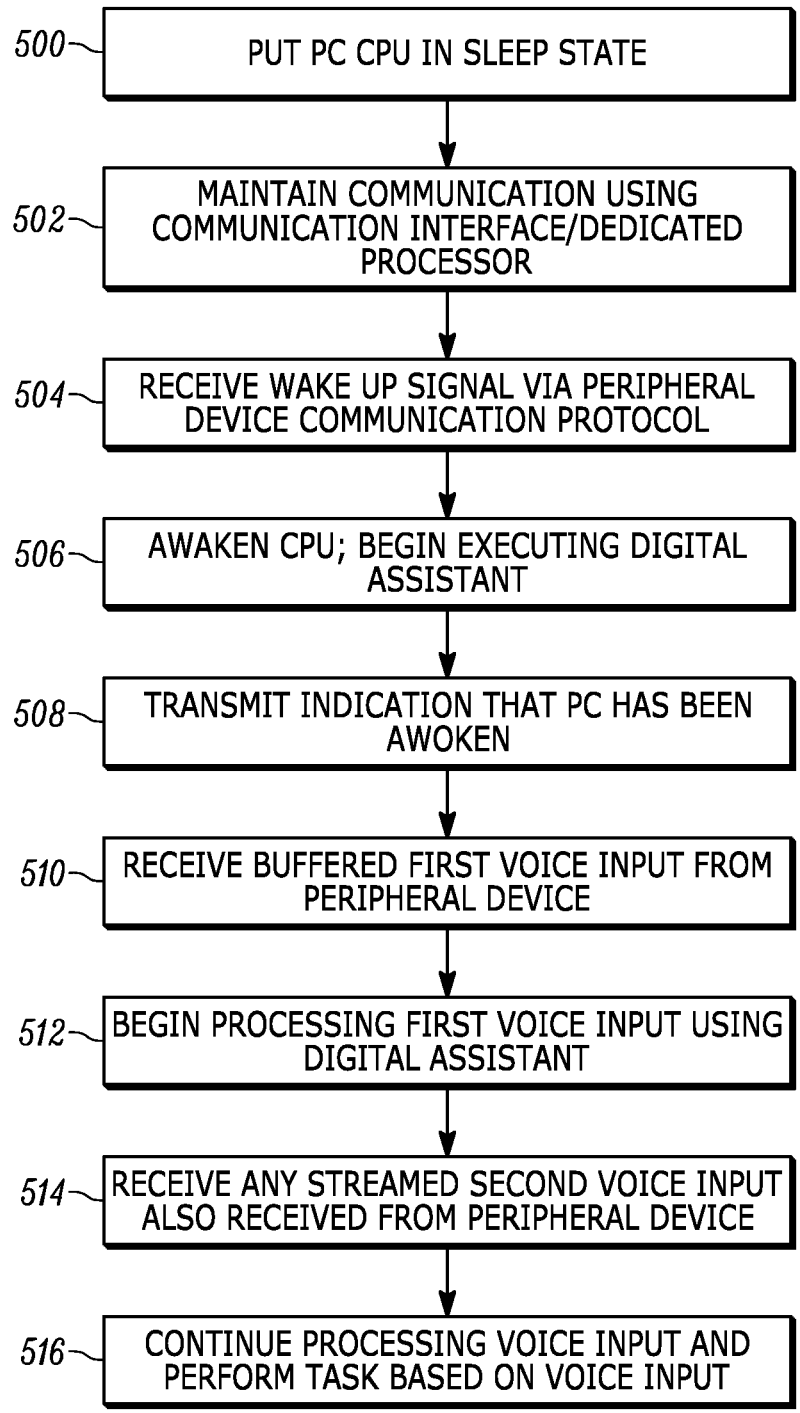

Example logic that may be executed by a peripheral device and personal computer in accordance with present principles is shown in FIGS. 4 and 5. FIG. 4 shows example logic that may be executed by a peripheral device, while FIG. 5 shows example logic that may be executed by a personal computer.

Beginning with FIG. 4, example logic is shown for execution by a peripheral device such as one or more of the devices 312-318 described above. In some examples, a DSP in particular may be used to execute the logic.

The logic may begin at block 400 of FIG. 4, where the peripheral device may power on its microphone. In some examples, the microphone may only be powered on responsive to receipt of a wireless transmission from a personal computer (PC) with which it communicates that the PC has entered a sleep state. In other examples, the microphone may always be powered on regardless of the power state of the PC.

From block 400 the logic may then proceed to block 402. At block 402 the peripheral device may await voice input of a response cue from a user. The logic may then proceed to block 404 where the peripheral device may receive voice input via its microphone. The logic may then proceed to decision diamond 406 where the peripheral device may, using its DSP, process the input as received from the microphone to determine whether a response cue was included in the input. A negative determination at diamond 406 may cause the logic to revert back to 402 where the logic may again await input of a response cue.

However, responsive to an affirmative determination at diamond 406, the logic may instead proceed to block 408. At block 408 the logic may transmit a wake up signal/command to the PC using a peripheral device communication protocol. Examples of peripheral device communication protocols include a Bluetooth communication protocol, a universal serial bus (USB) communication protocol, a local area network (LAN) communication protocol, and a wide area network (WAN) communication protocol. The signal/command that may be provided may be a "wake-on USB" command or other USB wake up command, a Bluetooth wake up command, etc. But regardless, it is to be understood that the peripheral device communication protocol that is used to transmit the wake up signal may be one the peripheral device also uses to communicate with the PC for purposes other than transmission of the wake up command. So, for example, if the peripheral device were a wireless mouse using a wireless USB communication protocol, the wake up signal may be transmitted using the same protocol and transmission frequency that the wireless mouse also uses to transmit movement data to the PC for movement of a cursor presented on a display of the PC based on movement of the mouse itself.

From block 408 the logic may then proceed to block 410 where the peripheral device may receive and buffer first voice input that is received, using the microphone of the peripheral device, subsequent to the response cue. The first voice input may be buffered by storing it in RAM or other storage of the peripheral device. The logic may then proceed to block 412 where the peripheral device may receive an indication from the PC that it has awoken from its sleep state.

Responsive to receipt of the signal at block 412, the logic may then move to block 414 where the peripheral device may transmit the buffered first input to the PC, and in some embodiments may also transmit the input indicating the response cue as well. From block 414 the logic may then proceed to block 416 where the logic may stream any additional, second voice input received after the first voice input via the peripheral device's microphone for further processing by the PC's digital assistant.

Now describing FIG. 5, it shows example logic that may be executed by a personal computer in accordance with present principles. Beginning at block 500, the PC may place itself in a sleep state, such as responsive to it being inactive or otherwise not used by a user for a threshold period of time. From block 500 the logic may proceed to block 502 where the PC may maintain (e.g., periodic) communication with a peripheral device using a peripheral device communication protocol and a dedicated processor for doing so, such as a microprocessor configured for doing so that is disposed within a network interface card or other peripheral device communication interface on the PC.

From block 502 the logic may proceed to block 504. At block 504 the PC may receive a wake up signal from the peripheral device that is received at the PC via the peripheral device communication protocol being used to maintain the communication with the peripheral device. Responsive to receipt of the wake up signal, the logic may proceed to block 506 where the PC may be awoken from its sleep state, and may begin or continue executing a digital assistant application stored at the PC that might have been executing prior to the PC entering its sleep state.

After block 506 the logic may proceed to block 508 where the PC may transmit an indication to the peripheral device that it has been awoken, such as transmitting the indication via the same peripheral device communication protocol through which the wake up signal was received. From block 508 the logic may proceed to block 510 where the PC may receive first voice input collected at the peripheral device itself that was buffered at the peripheral device while the PC awoke from its sleep state, as provided by the peripheral device using the wireless communication protocol.

After block 510 the logic may proceed to block 512. At block 512 the PC may begin processing the first voice input using the digital assistant application executing at the PC. The logic may then proceed to block 514 where the PC may receive any additional, streamed second voice input that might also be received via the peripheral device's microphone. The logic may then move to block 516 where the PC may continue processing the first voice input and also process any second voice input that is received. Based on the processing of the input, the PC may perform a task in conformance with the first and second voice input. As examples, the task may be for the digital assistant to send an email to a contact of the user, to search the Internet for the answer to a question posed by the user, or to present photos as discussed above in reference to FIG. 3. Accordingly, it is to be generally understood that the functions the assistant is able to execute may be generally similar to those executed by, for instance, Amazon's Alexa, Apple's Siri, or the Lenovo Smart Assistant sold by Lenovo (US) Inc. of Morrisville, N.C.

Figure 6:
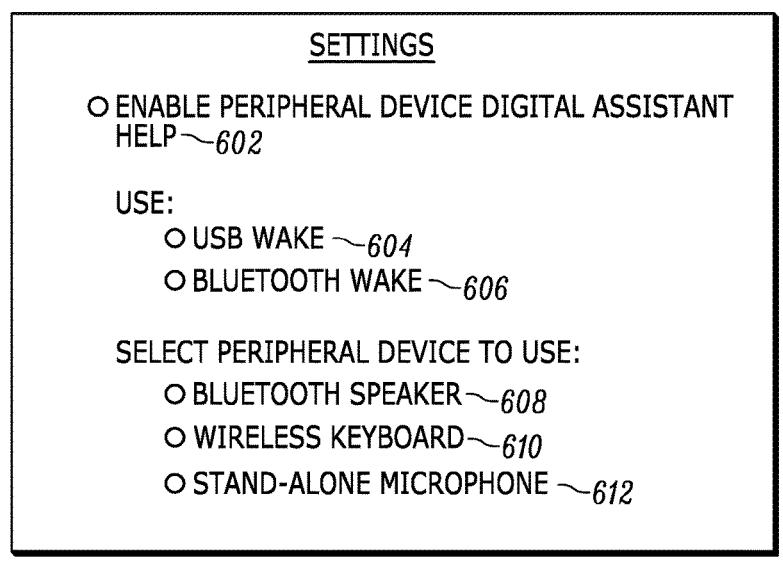
FIG. 6 is an example user interface (UI) in accordance with present principles.

Continuing the detailed description in reference to FIG. 6, it shows an example user interface (UI) 600 that may be presented on a display in accordance with present principles, such as a display on or otherwise accessible to a PC. The UI 600 may be for configuring settings of a digital assistant in accordance with present principles. Each option on the UI 600 that will be discussed below may be selected using the respective radio button shown adjacent to the respective option.

The UI 600 may include a first option 602 that is selectable to enable the peripheral device usage for purposes of executing a digital assistant to perform a task as disclosed herein. For example, selection of the first option 602 may turn on a setting that enables execution of the logic of one or both of FIGS. 4 and 5 so that a response cue may be received at a peripheral device, be used to wake up a PC, and then have additional voice input received at the peripheral device be passed to the PC for processing using the PC's digital assistant.

The UI 600 may also include options 604, 606 to respectively select a particular peripheral device communication protocol to use for communication of wake up signals, voice input, indications, etc. between a peripheral device and PC as disclosed herein. Thus, option 604 may be selected to enable use of USB wake up and/or USB communication, while option 606 may be selected to enable use of Bluetooth wake up and/or Bluetooth communication. Still other peripheral device communication protocols may be listed as well, but only USB and Bluetooth have been shown for simplicity.

The UI 600 may also include options 608, 610, and 612 to select respective, particular peripheral devices in communication with the PC to use for receiving response cues and voice input to pass to the PC as disclosed herein. Accordingly, option 608 may be selected to enable use of a Bluetooth speaker that communicates with the PC, option 610 may be selected to enable use of a wireless keyboard that communicates with the PC, and option 612 may be selected to enable use of a stand-alone microphone that communicates with the PC. Still other peripheral devices may be listed as well, but only the Bluetooth speaker, wireless keyboard, and microphone have been shown for simplicity.

Moving on from FIG. 6, it is to be understood that in some embodiments a television may establish a peripheral device in accordance with present principles. A smart phone or tablet computer and either of Bluetooth or Wi-Fi communication may also be used, if desired.

It is to be further understood that that although the embodiments above were disclosed in relation to peripheral devices, in some embodiments an embedded module within a PC's housing may also be used in accordance with present principles, using an internal connector.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory, propagating signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   a microphone accessible to the at least one processor;
   a communication interface accessible to the at least one processor; and
   storage accessible to the at least one processor and bearing instructions executable by the at least one processor to:
   power on the microphone responsive to receipt of a transmission that indicates that a second device has entered a sleep state, the second device being different from the first device;
   await first voice input to the microphone that comprises a response cue;
   receive, from the microphone, the first voice input comprising the response cue; and
   responsive to receipt of the first voice input comprising the response cue, transmit a wake up command to the second device, the wake up command being transmitted via the communication interface using a peripheral device communication protocol.

2. The first device of claim 1, wherein the first device is a mouse.

3. The first device of claim 1, wherein the first device is a keyboard.

4. The first device of claim 3, wherein the at least one processor comprises a digital signal processor (DSP).

5. The first device of claim 1, wherein the first device is a wireless keyboard.

6. The first device of claim 1, wherein the peripheral device communication protocol comprises an infrared (IR) communication protocol.

7. The first device of claim 1, wherein the instructions are executable by the at least one processor to:
   buffer, at the first device, second voice input other than the response cue;
   receive an indication that the second device has transitioned to a wake state; and
   responsive to receipt of the indication, pass the buffered second voice input to the second device.

8. The first device of claim 7, wherein the instructions are executable by the at least one processor to:
   subsequent to passing the buffered second voice input to the second device, stream third voice input received at the microphone to the second device.

9. A computer readable storage medium that is not a transitory signal, the computer readable storage medium comprising instructions executable by at least one processor to:
   power on a microphone of a peripheral device responsive to receipt of a transmission that indicates that a second device has entered a low power state, the second device being different from the peripheral device;
   receive a response cue at the peripheral device via the microphone;
   transmit, from the peripheral device and responsive to receipt of the response cue at the peripheral device, a wake up command to the second device, the wake up command being transmitted to the second device using a communication protocol the peripheral device also uses to communicate with the second device for purposes other than transmission of the wake up command.

10. The computer readable storage medium of claim 9, wherein the peripheral device is a mouse and wherein the instructions are executable by the at least one processor to:
    buffer, at the peripheral device, first voice input other than the response cue that is received at the peripheral device;
    receive, at the peripheral device, a signal that the second device has transitioned to a wake state; and
    transmit, from the peripheral device and responsive to receipt of the signal, the first voice input to the second device.

11. A method, comprising:
    powering on a microphone of a peripheral device responsive to receipt of a transmission that indicates that a second device has entered a low power state, the second device being different from the peripheral device;
    receiving a response cue at the peripheral device via the microphone;
    transmitting, from the peripheral device and responsive to receiving the response cue at the peripheral device, a wake up command to the second device, wherein the wake up command is transmitted to the second device using a peripheral device communication protocol.

12. The method of claim 11, wherein the peripheral device comprises a mouse.

13. The method of claim 11, wherein the peripheral device comprises a keyboard.

14. The method of claim 11, wherein the response cue is recognized at the peripheral device using a digital signal processor (DSP).

15. The method of claim 11, wherein the wake up command is transmitted to the second device via a communication interface disposed on the peripheral device.

16. The method of claim 11, wherein the peripheral device communication protocol comprises a universal serial bus (USB) communication protocol.

17. The method of claim 11, wherein the peripheral device communication protocol comprises an infrared (IR) communication protocol.

18. The method of claim 11, wherein the peripheral device communication protocol is one that the peripheral device also uses to communicate with the second device for purposes other than transmission of the wake up command.

19. The method of claim 11, comprising:
    buffering, at the peripheral device, first voice input other than the response cue;
    receiving, at the peripheral device, a signal that the second device has transitioned to a higher power state relative to the low power state; and
    transmitting, from the peripheral device and responsive to receipt of the signal, the first voice input to the second device.

20. The method of claim 11, comprising:

presenting a graphical user interface (GUI) on a display, the GUI comprising an option that is selectable to turn on a setting that enables the receiving and the transmitting.

* * * * *